(12) United States Patent
Barbati et al.

(10) Patent No.: US 11,597,153 B1
(45) Date of Patent: Mar. 7, 2023

(54) SYSTEMS AND METHODS FOR ADJUSTING A THREE-DIMENSIONAL (3D) MODEL DURING ADDITIVE MANUFACTURING

(71) Applicant: Desktop Metal, Inc., Burlington, MA (US)

(72) Inventors: Alexander C. Barbati, Melrose, MA (US); Michael Andrew Gibson, Boston, MA (US); George Hudelson, Billerica, MA (US); Nicholas Mark Mykulowycz, Boxford, MA (US); Brian D. Kernan, Andover, MA (US); Nihan Tuncer, Cambridge, MA (US)

(73) Assignee: Desktop Metal, Inc., Burlington, MA (US)

( * ) Notice: Subject to any disclaimer, the term of this patent is extended or adjusted under 35 U.S.C. 154(b) by 0 days.

(21) Appl. No.: 16/453,691

(22) Filed: Jun. 26, 2019

Related U.S. Application Data

(60) Provisional application No. 62/690,143, filed on Jun. 26, 2018.

(51) Int. Cl.
| | |
|---|---|
| *B29C 64/393* | (2017.01) |
| *B29C 64/118* | (2017.01) |
| *B29C 64/165* | (2017.01) |
| *B29C 64/379* | (2017.01) |
| *B33Y 50/02* | (2015.01) |
| *B33Y 10/00* | (2015.01) |
| *B33Y 40/20* | (2020.01) |

(52) U.S. Cl.
CPC .......... *B29C 64/393* (2017.08); *B29C 64/118* (2017.08); *B29C 64/165* (2017.08); *B29C 64/379* (2017.08); *B33Y 10/00* (2014.12); *B33Y 40/20* (2020.01); *B33Y 50/02* (2014.12)

(58) Field of Classification Search
CPC ... B29C 64/393; B29C 64/379; B29C 64/118; B29C 64/165; B33Y 40/00; B33Y 10/00; B33Y 50/02
USPC .......................................................... 700/98
See application file for complete search history.

(56) References Cited

U.S. PATENT DOCUMENTS

| | | | | |
|---|---|---|---|---|
| 2010/0075170 | A1* | 3/2010 | Adair ..................... | A61B 17/30 428/546 |
| 2014/0107823 | A1* | 4/2014 | Huang .................... | G06F 30/00 700/98 |

(Continued)

*Primary Examiner* — Chun Cao
(74) *Attorney, Agent, or Firm* — Desktop Metal, Inc.; Jonathan D. Hall

(57) ABSTRACT

Embodiments of the present disclosure are drawn to systems and methods for adjusting a three-dimensional (3D) model used in metal additive manufacturing to maintain dimensional accuracy and repeatability of a fabricated 3D part. These embodiments may be used to reduce or remove geometric distortions in the fabricated 3D part. One exemplary method may include: receiving, via one or more processors, a selection made by a user; receiving a 3D model of a desired part; retrieving at least one model constant based on the user's selection; receiving an input of at least one process variable setting from a set of process variable settings; generating transformation factors based on the at least one process variable parameter and the at least one model constant; transforming the 3D model of the desired part based on the transformation factors; and generating processing instructions for fabricating the transformed 3D model of the desired part.

4 Claims, 11 Drawing Sheets

(56) References Cited

U.S. PATENT DOCUMENTS

| | | | |
|---|---|---|---|
| 2017/0066196 A1* | 3/2017 | Beard | B29C 64/393 |
| 2018/0297272 A1* | 10/2018 | Preston | B33Y 50/02 |
| 2019/0054700 A1* | 2/2019 | Chandar | B33Y 50/02 |
| 2019/0134914 A1* | 5/2019 | Gonzalez | B29C 64/393 |
| 2020/0139436 A1* | 5/2020 | Lehmann | B22F 3/1055 |

* cited by examiner

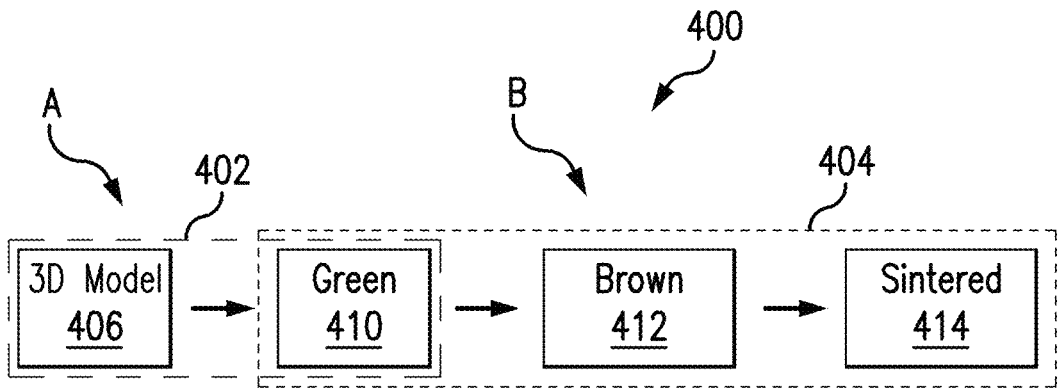

FIG. 4A $$\text{Total Shrinkage} = \underbrace{\frac{\text{3D Model} - \text{green}}{\text{3D Model dimension}}}_{A} + \underbrace{\frac{\text{green} - \text{sintered}}{\text{3D Model dimension}}}_{B}$$

FIG. 4B $$\text{Shrinkage Error} = E\underbrace{\left\{\frac{\text{3D Model} - \text{green}}{\text{3D Model dimension}}\right\}}_{A} + E\underbrace{\left\{\frac{\text{green} - \text{sintered}}{\text{3D Model dimension}}\right\}}_{B}$$

FIG. 4C

SYSTEMS AND METHODS FOR ADJUSTING A THREE-DIMENSIONAL (3D) MODEL DURING ADDITIVE MANUFACTURING

CROSS-REFERENCE TO RELATED APPLICATION

This application is based upon and claims priority to U.S. provisional patent application 62/690,143, filed Jun. 26, 2018. The entire content of this application is incorporated by reference herein.

TECHNICAL FIELD

Various embodiments of the present disclosure relate generally to additive manufacturing. More specifically, particular embodiments of the present disclosure relate to systems and methods for additive three-dimensional ("3D") fabrication by adjusting 3D model geometries to compensate for dimensional changes (e.g., shrinkage) caused by a fabrication process (e.g., printing, debinding, and sintering a desired part for fabrication). These systems and methods relate to parameter-dependent, or system-dependent, transformation of 3D model geometry to transform or adjust a 3D model to offset distortions caused by printing and subsequent post-print processing steps, while endeavoring to maintain dimensional accuracy and repeatability in processed part dimensions.

BACKGROUND

In the additive manufacturing of 3D parts, dimensional change is commonly encountered during the fabrication process. Existing systems for fabricating or designing mechanical parts using additive manufacturing techniques require that the geometry of the part be known in advance. However, current systems do not account for the nuanced way in which parameters may drive differences in dimensional change across various stages of a given additive manufacturing fabrication process. In some cases, for example, where a set of parameters cannot be changed, tuned, or otherwise adjusted (i.e., the parameters are fixed), a part may be fabricated and the dimensional change (e.g., shrinkage or other geometric distortion) characterized. Since the parameters are fixed, the characterized dimensional change applies to the fixed parameters only and excessive experimentation may be required for the case where the parameters are desired to be changed, tuned, or otherwise adjusted and the dimensional change predicted.

During operation of classical additive processes, an operator (e.g., user) may adjust process parameters to change an outcome of the part; however, during operation any flaws are fed back to the system during processing. In other words, unacceptable parts are fabricated prior to processing acceptable parts. These classical additive processes, such as metal injection molding, injection molding, and casting, tend to produce items in fairly highly volumes using dedicated tooling; however, an additive approach that does not require bespoke tooling is desirable.

Thus, there remains a need for a system capable of generating an adjusted 3D model of a desired part, fabricated by additive manufacturing, that may account for any amount of dimensional change or deformation that may occur between the instance material is deposited during fabrication and final use of the fabricated part by a user. A need also exists to tune and/or adjust a set of process parameters so as to create transformation factors (e.g., scale factors), which may be used to transform 3D part geometry to compensate for geometric distortions in a fabricated part (e.g., shrinkage) and maintain part dimensional accuracy. These transformation factors may be applied to a window (e.g., tens to hundreds) of process parameters.

SUMMARY

Existing 3D model geometry tools (e.g., CAD, STL, etc.) require software that allows a user to adjust process parameters to account for geometric flaws or distortions; however, these process parameters are fed back during processing of a desired 3D part, which results in flawed parts being made before acceptable parts are produced. Embodiments of the present disclosure take a different approach and provide systems and methods that may enable a user to produce one-off parts accurately the first time they are processed by determining and capturing the effect of sensitive process parameters and then feeding these parameters forward to appropriately transform (e.g., scale) a 3D model of a desired part before the part is fabricated.

The disclosed systems and methods thus provide a system that may adaptively and automatically adjust a 3D model of a mechanical part, and, more specifically, to predict and account for dimensional change and/or deformation prior to fabrication of the mechanical part by allowing for customizable process parameters.

In accordance with an exemplary method, the method includes maintaining dimensional accuracy of a fabricated three-dimensional (3D) part by adjusting a 3D model used in metal additive manufacturing, comprising: receiving, using a processor, a selection for fabricating a desired 3D part; receiving a 3D model of the desired 3D part; retrieving at least one model constant based on the selection; receiving an input of at least one process variable parameter from a set of process variable parameters; generating transformation factors based on the at least one process variable parameter and the at least one model constant; transforming the 3D model of the desired part based on the transformation factors; and generating processing instructions for fabricating the transformed 3D model of the desired part.

In accordance with an exemplary method, the method includes maintaining dimensional accuracy of a fabricated three-dimensional (3D) part by adjusting a 3D model used in metal additive manufacturing, comprising: receiving, using a processor, a selection for fabricating a desired 3D part; receiving a 3D model of the desired 3D part; receiving an input of at least one process variable parameter from a set of process variable parameters; retrieving at least one model and at least one associated model constant based on the selection; generating transformation factors based on the at least one process variable parameter and the at least one model constant; transforming the 3D model of the desired part based on the transformation factors; and generating processing instructions for fabricating the transformed 3D model of the desired part.

In accordance with another embodiment, a system for adjusting a three-dimensional (3D) model used in metal additive manufacturing, comprising: a processor configured to: receive, using a processor, a selection for fabricating a desired 3D part; receive a 3D model of the desired 3D part; retrieve at least one model constant based on the selection; receive an input of at least one process variable parameter from a set of process variable parameters; generate transformation factors based on the at least one process variable parameter and the at least one model constant; transform the 3D model of the desired part based on the transformation factors; and generate processing instructions for fabricating the transformed 3D model of the desired part.

In accordance with another embodiment, a non-transitory computer-readable medium storing instructions, the instructions, when executed by a computer system, cause the computer system to perform a method, the method comprising: receiving, using a processor, a selection for fabricating a desired 3D part; receiving a 3D model of the desired 3D part; retrieving at least one model constant based on the selection; receiving an input of at least one process variable parameter from a set of process variable parameters; generating transformation factors based on the at least one process variable parameter and the at least one model constant; transforming the 3D model of the desired part based on the transformation factors; and generating processing instructions for fabricating the transformed 3D model of the desired part.

This invention can be implemented in a variety of ways, including combinations of software and hardware, circuitry, or firmware.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

FIG. 4A is a flow diagram of an exemplary fabrication process for fabricating a desired, processed 3D part from a 3D model, according to an embodiment of the present disclosure.

FIG. 4B is an exemplary equation for measuring total shrinkage of a 3D fabricated part during a fabrication process (e.g., dimensional changes of a 3D processed part from a 3D model part), according to an embodiment of the present disclosure.

FIG. 4C is an exemplary equation for calculating total shrinkage error of a 3D fabricated part during a fabrication process (e.g., shrinkage error of a 3D processed part from a 3D model part), according to an embodiment of the present disclosure.

DETAILED DESCRIPTION

Figure 1A:
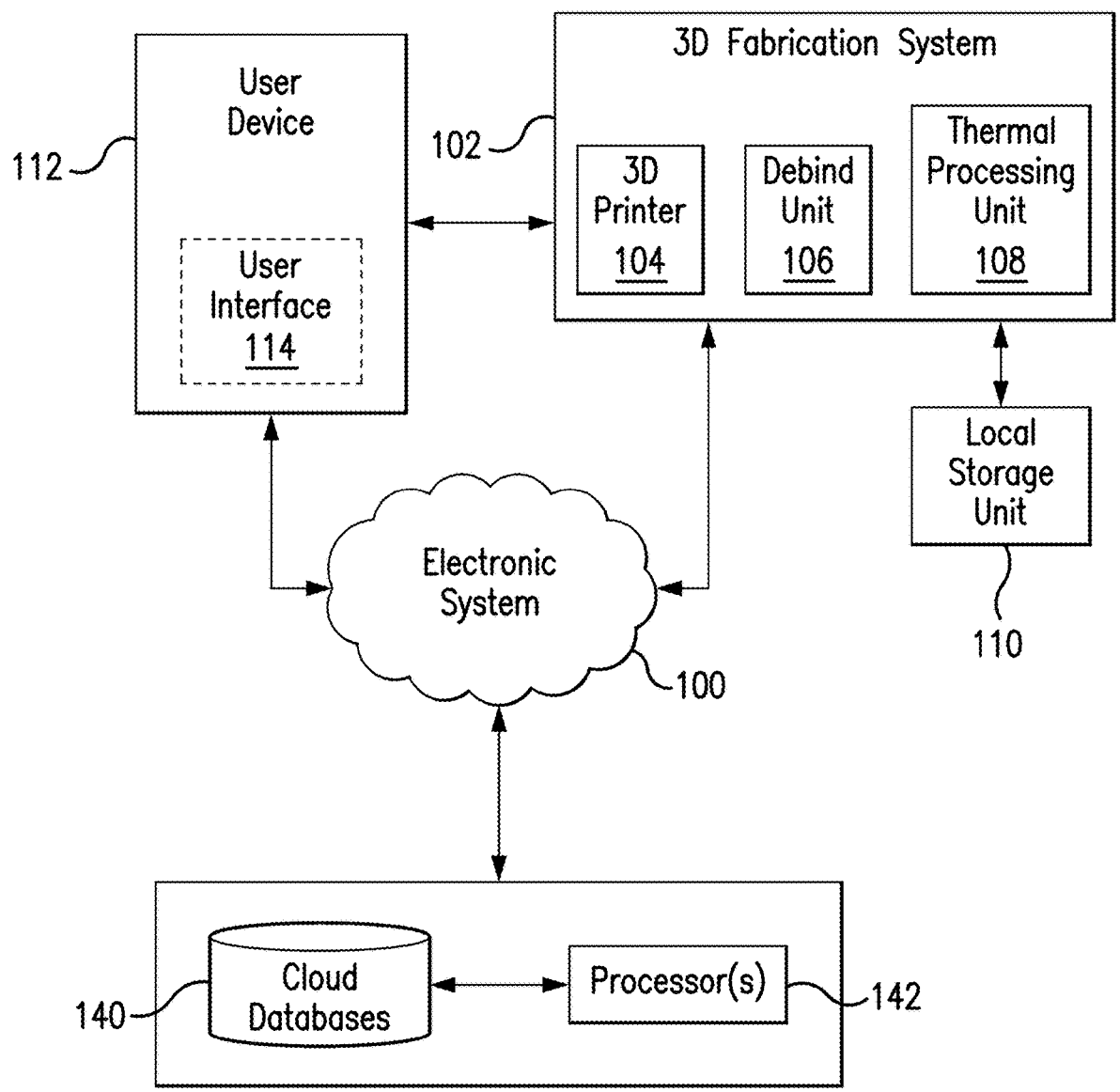
FIG. 1A is a schematic diagram of an exemplary network environment for adjusting a 3D model used in metal additive manufacturing using an exemplary 3D fabrication system (i.e., an extrusion-based fabrication system), according to an embodiment of the present disclosure.

While the present disclosure is described herein with reference to illustrative embodiments for particular applications, it should be understood that embodiments of the present disclosure are not limited thereto. Other embodiments are possible, and modifications can be made to the described embodiments within the spirit and scope of the teachings herein, as they may be applied to the above-noted field of the present disclosure or to any additional fields in which such embodiments would be of significant utility.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A description of example embodiments follows. The teachings of all patents, published applications, and references cited herein are incorporated by reference in their entireties. Existing 3D modeling software and systems (e.g., CAD tools, tools to create STL formatted 3D representations, etc.) require that a user develop an idea or image of a mechanical part, then create the geometry explicitly, and prior to the mechanical part being fabricated. As explained above, however, when such mechanical parts are fabricated, they may undergo an amount of geometric distortion or flaw that occurs during any step of the fabrication process. As described above, the disclosed methods and systems, however, provide a method for allowing a user (e.g., operator of a 3D fabrication system) to adjust a 3D model (e.g., STL file, CAD drawing, or other 3D representation of a desired part for fabrication). This adjustment is based on transforming the 3D model to account for, in advance, any predictable geometric distortions (e.g., shrinkage) in the finally fabricated part (e.g., after processing a printed part).

The described method may be useful in maintaining dimensional accuracy and repeatability in processed (e.g., printed, debound, and sintered) object dimensions of a 3D part, which may be crucial when considering part tolerance requirements. The described method taught herein may be used to produce parts of vastly different size (e.g., 0.5 mm to 500 mm) with different geometric features and also with vastly different variable process parameters. In an exemplary embodiment, a user may select a subset of these variable process parameters. In such a scenario, the user may reasonably produce a part and define a shrinkage, for example, for that subset of process parameters. These parameters may include, for example, the speed at which the object is printed, the material(s) used to print the object, the dimensions of the strands (or voxels) used to build the object, physicochemical characteristics used in chemical debind, physicochemical characteristics used in thermal debind and sintering, and even the orientation of the part in the various process stages. Additional parameters are provided later in this disclosure.

An advantage of the methods and systems described in this disclosure is to provide tunable or adjustable parameters (e.g., process variable settings set by a user) that may then enable software (e.g. code) and/or hardware to generate a transformation matrix. In an exemplary embodiment, at least one transformation factor may be represented in matrix form. In one embodiment, transformation factors may be assigned for each of an X-axis, a Y-axis, and/or a Z-axis or a combination thereof. As an example, in an exemplary transformation matrix, where an X-axis is assigned a transformation factor of 1.0, a Y-axis is assigned a transformation factor of 1.0, and a Z-axis is assigned a transformation factor of 1.2, the transformation matrix represents a 20% stretching of a dimension along the Z-axis. In another embodiment, these transformation factors may be referred to as scale factors. These transformation factors may be used to transform (e.g., scale) a 3D model of a desired part for fabrication. The transformed 3D model may then account for predictable geometric distortions in a finally fabricated 3D part that the user may wish to avoid (e.g., shrinkage of the overall part, warping of the part, sagging, thermal warping in DMLS, chemical warping in SLA, thermal warping in FDM, thermal expansion, and any other geometric distortion caused by additive manufacturing fabrication processes). Some examples of additive manufacturing processes include direct metal laser sintering (DMLS), electron beam melting (EBM), selective heat sintering (SHS), selective laser melting (SLM), selective laser sintering (SLS), binder jetting, and material jetting.

For purposes of the present disclosure, the phrases below should be interpreted as follows, unless a different meaning is explicitly provided or otherwise clear from the context. "Parameters" may refer to physical things in a system (e.g., 3D fabrication system) that may be changed. "Process variables" or "process variable settings" may refer to a subset of parameters that may be changed. A "part" is an object of any dimension and extent produced, in the process of being produced, or intending to be produced. A "3D fabrication system" refers to one or more components that may be used to print a part and process the printed part using one or more post-processing techniques. An exemplary embodiment of a 3D fabrication system may include a 3D printer to print a desired part, a debinding unit to debind the printed part, and a sintering unit to sinter the debound printed part. A "fabrication process" is any one or more specific operations that create, act upon, or otherwise modify a part, such as, for example, any step in the printing and/or post-print processing steps (e.g., debinding, curing, crosslinking, heat treating, sintering, chemical debinding, etc.) that are described herein. Throughout the present disclosure "3D model" or "part model" may refer to an electronic 3D representation, in software or hardware, of a desired part that is produced or intended to be produced. Examples of a 3D models include STL and CAD. A "printed part" or "green part" as taught herein, may refer to an object that is printed in part of in full, but that has not undergone any post-printing processing steps (e.g., debinding, sintering, cross-linking, etc.). A "printed part" or "green part" may also include additionally deposited structures, such as, a raft, a support structure, and supporting interface structures, as taught herein. A "brown part" may refer to an object that has been printed and debound, but not yet sintered. A "sintered part" may refers to an object that has been sintered. In an alternate embodiment, and according to an exemplary fabrication system taught herein, there may be no distinction between a brown part and a green part; that is, for example, in one embodiment, a green/brown part may be printed and then cured/cross-linked, and optionally depowdered. A "processed printed part (or processed part)" may refer to a subset of an object that a user originally intended to produce at the start of fabrication. This processed part may correspond to the 3D model provided by the user at the start of the 3D fabrication process.

A "material" may be any composition(s) or component(s) acted upon by a fabrication process, as taught herein, to form a part, such as any of the build materials, interface materials, support materials, and the like described herein. The material may be modified by the process, such that the material has different properties than those exhibited by the starting material. This may, for example, include macroscopic properties such as the shape of the material, bulk properties such as tensile strength or coefficient of thermal expansion, microscopic properties such as polymer crosslinking or crystal grain structure, and so forth. In any fabrication process, a model may be selected for fabrication from a target material. In addition to a part geometry (from a digital 3D model) and material (from a fabrication process), the process may introduce dimensional dependences to the final form of a part based on various process parameters. Additionally, the final form of the part may depend upon the interaction between the desired geometric form of the part, the material, and/or the fabrication process, as well as on varying combinations of the foregoing. For example, a solid block of metal may heat and thermally expand during machining of a part. If the thermal expansion is not accounted for or mitigated by holding the block at a fixed and uniform temperature, parameters that might affect temperature such as the rotation rate of the cutter, depth of cut, relative speed between the cutter and part, cutter material, and part material may also affect the final tolerance of the part.

A printed part may also include additionally deposited structures, such as, a raft, a support structure, and supporting interface structures. "Rafts" and "support structures" refer to all parts of the desired 3D model that may be produced during a fabrication process, but that are not a part of a finally desired part by a user. A raft may be used as a structure that may be seated underneath a part to be fabricated such that when the raft enters a heating unit (e.g., furnace, sintering unit, etc.), the raft may drag along a retort, or other surface interior to the furnace, as it shrinks, at a rate and magnitude similar to or dissimilar from the part to be fabricated, to absorb friction so the part to be fabricated shrinks without constraint from the retort or other surface interior to the furnace upon which the raft and part to be fabricated are suspended. Rafts and/or support structures may be formed from metal or non-metal materials. Throughout the present disclosure, supporting interface structures refer to a supporting interface material or a supporting interface layer. In some embodiments, these supporting interface structures may be comprised of a non-sintering material that may be placed between the part and a support structure. In other embodiments, these supporting interface structures may be comprised of material which may undergo a shrinkage similar to the part to be fabricated, but which resists bonding with the part to be fabricated. Supporting interface structures may be formed from a ceramic material.

Example embodiments of the present disclosure address parameter-dependent transforming (e.g., scaling, offsetting, scaling and offsetting, etc.) of 3D model geometry to compensate for dimensional changes in a fabrication process. Dimensional changes commonly occur between a digital 3D model geometry and a final part during 3D printing and post-print processing. However, as previously described herein, traditional techniques appear limited to generalized dimensional scaling after a part is fabricated, e.g., along the three major axes of an object fabricated in an additive manufacturing process. These traditional techniques are time-consuming, slow, and labor-intensive. For example, at a minimum, these traditional techniques may require that each part be printed at least twice: first, to characterize the deformation in the printed part, and second a time, to correct for the deformation that was initially characterized. These traditional techniques may permit a user to compensate for different parameters before the part is physically fabricated by the additive manufacturing system but may not permit the user to do so during the fabrication steps. In other words, present techniques do not permit the user to vary a set of parameters, fabricate the part, and achieve the desired shape and dimensions without first characterizing how the parameters, desired part, and fabrication process interact to affect the desired shape and dimensions of the part. This fails to account for the ways in which multiple, different fabrication parameters may cause dimensional change across part geometries, tool paths, build materials, printing processes, post-print processing, and so forth. Where these parameters are adjustable or tunable, as taught herein, objects may be responsively and dynamically scaled to obtain more accurate final parts. In an exemplary embodiment, responses to individual parameters may be determined based on, e.g., simulation, physical modeling, empirical measurements, or some combination of these.

For example, various part geometries may be printed using various parameter settings, and the resulting objects may then be measured for dimensional accuracy. In an exemplary embodiment, part dimensions (e.g., linear dimensions) and/or geometric tolerances may be measured using a ruler, a 2D scanner, a 3D scanner, a caliper, a micrometer, a height gauge, a coordinate measuring machine, a laser displacement sensor, and/or a structured light scanner. In an exemplary embodiment, volume measurements may be achieved with a 3D scanner displacement method (e.g., Archimedes measurement). In this manner, a library of empirical transformation effects (e.g., scaling effects, such as, stretching, offsetting, rotation, etc.) may be created and applied to account for varying parameters, e.g., when slicing or otherwise preparing a three-dimensional model of an object for printing. In another aspect, linear shrinkage along strands or beads of material as a function of thermal history or deposition speed and inter-layer shrinkage, e.g., as a function of z-axis step size, volume flow rates, or the like, may be physically modeled in order to predict relationships among various print parameters and part shrinkage. In another aspect, multiple techniques may be employed, e.g. individually for different print parameters, or together, such as by weighting different model predictions to provide an aggregated shrinkage model. In another aspect, models for specific parameter values may be interpolated, averaged, or otherwise processed to provide a transformation model (e.g., shrinkage model) according to current printing conditions.

In a multi-step fabrication process, such as an extrusion-based fabrication process (e.g., fused filament fabrication) or a powder-bed binder jetting process, each step may have user-controlled parameters that may affect the final dimensions of the printed part. Consequently, the same part may be produced using two different parameter sets, and, owing to the dependencies of the final geometry on the parameter set, the parts may have different shapes notwithstanding an identical nominal geometry (e.g., the geometry specified by a source digital 3D model). For example, dimensional variations may result from, but are not limited to: thermal cycling (e.g., expansion/contraction); material deposition (e.g., impaction of jetted binder); drying/imbibition of fluid (or concentration change); material dissolution/erosion (e.g., debinding); change of phase (e.g., melting/solidification/crosslinking); chemical reaction (e.g., reduction, oxidation, carbiding); and/or material densification (e.g., sintering).

These phenomena may be active in the handling and production of raw material (e.g., feedstock, metal/ceramic powder, polymer components, etc.), deposition characteristics of each layer, debinding processes, cleaning, depowdering, sintering, and so forth. A number of examples are provided below by way of non-limiting examples. In the following description, "bound metal deposition" or "BMD" is used as a non-limiting example of an extrusion-based fabrication process similar to fused filament fabrication using sinterable build materials. "Single pass jetting" or "SPJ" is used as a non-limiting example of a powder-bed binder jetting process in which a sinterable powder is bound together to form a sinterable object. Numerous other techniques are known in the art and may similarly benefit from 3D model adjustment (e.g., parameterized shrinkage modeling or parameterized transformation modeling) as described herein.

Reference will now be made in detail to the exemplary embodiments of the disclosure, examples of which are illustrated in the accompanying drawings. Wherever possible, the same reference numbers will be used throughout the drawings to refer to the same or like parts.

FIG. 1A is a schematic diagram of a network environment in which various systems may adjust a 3D model used in metal additive manufacturing to maintain dimensional accuracy and repeatability of a fabricated 3D part, in which example embodiments may be implemented. As shown in FIG. 1A, the environment may include a 3D fabrication system 102, a user device 112, and one or more external databases 140 (e.g., cloud databases) operatively connected to one or more processors 142, and all operatively and communicatively connected via an electronic system 100. In an embodiment, a controller (e.g., flash controller, microcontroller, application delivery controller, baseboard management controller, session border controller, primary domain controller, or the like), may be used to control the flow of data between the electronic system 100, the 3D fabrication system 102, the local storage unit 110, the cloud database(s), and/or the processors 142. Computer-executable software for adjusting the 3D model, as taught herein, may be stored in the cloud databases 140, and/or in the local storage unit 110. One or more processors 142 may be employed to operate the databases 140, and communicatively couple the software stored in the databases 140 to either the user device 112 and/or the 3D fabrication system 102 via the electronic system 100. In an exemplary embodiment, the processor 142 may be configured or configurable to execute a process for adjusting a 3D model, according to embodiments described herein. In another exemplary embodiment, the user device 112, having its own processor(s) may be configured or configurable to execute the software stored in the databases 140 for allowing a user to transform (or scale) an original 3D model of a desired part the user intends on fabricating to a transformed 3D model of the desired part. The transformed 3D model of the desired part is then used by the 3D fabrication system 102 to compensate for the predictable geometric distortions (e.g., shrinkage of the processed part) in the desired part and maintain its dimensional accuracy. Circuitry or other hardware systems may be used to replace software functions in whole or in part.

In an exemplary embodiment, the electronic system 100 may include a central processing unit (CPU), a system memory, a graphics processing unit (GPU), and/or a display device. The CPU may be configured to receive an input from the user, for example, a user selection or user information from the input devices (e.g., user device 112, user interface 114). In some embodiments, the system memory, or the 3D fabrication system, may comprise a 3D model generator (e.g. 3D model scanner that may analyze a 3D solid object to create a 3D model).

The software described above may include code used to adjust a 3D model according to embodiments described in the present disclosure, and aspects taught herein. In an exemplary, embodiment, the code may be referred as a compiled set of instructions sent to the 3D printer to produce or fabricate the desired printed object. In an exemplary embodiment, a library of parameters, a set of parameters, a look-up table containing parameters, or some other equivalent, for example, may be stored in the external cloud databases 140. The parameters are process variable parameters as taught herein. In a step, described in further detail later in this disclosure, a user may selectively choose, for example, via the user interface 114, a subset of parameters from the set of parameters, the library of parameters, or the look-up table using the user device 112 via the electronic system 100.

The 3D fabrication system 102 may comprise a 3D printer 104, a debind unit 106, and a thermal processing unit (e.g., sintering furnace, thermal processing furnace, cross-link oven, de-waxing furnace, heat-treating furnace, carburizing furnace, etc.) 108. The 3D fabrication system 102, as shown in FIG. 1A, may comprise a 3D fabrication system used for extrusion-based fabrication. One highly suitable extrusion-based 3D fabrication system is produced by Desktop Metal, Inc. (Burlington, Mass.) and marketed as the STUDIO SYSTEM. The user device 112 may include a user interface 114, as shown. The 3D fabrication system 102 may be communicatively coupled to the user device 112 and may also be coupled to one or more cloud databases 140 via the electronic system 100. In an exemplary embodiment, the user device 112 may be separate from the 3D fabrication, as shown in FIG. 1A. Alternatively, in one embodiment, the user device 112 may be formed integral with the 3D fabrication system, for example, may be mounted to or integral with any one of the 3D printer 104, the debind unit 106, or the thermal processing unit 108. In one embodiment, a local storage unit 110 may be operatively and communicatively connected to the 3D fabrication system 102, as shown. The local storage unit 110 may include one or more processors and may also be configured to store software. In an exemplary embodiment, the software stored on the local storage unit 110 may be identical to the software stored in the one or more external cloud databases 140. For example, if the 3D fabrication system 102 is incapable of accessing or denied access to the software stored in the one or more external cloud databases 140, the electronic system 100 will utilize the software stored on the local storage unit 110 for executing code to adjust a 3D model. In one embodiment, the computer-executable software stored in the cloud databases 140 may also exist locally on a network, or other location, defined by a user. In an alternate embodiment, the software stored in the local storage unit 110 is not identical and different from the software stored in the one or more external databases 140. For example, the version of the software stored in the local storage unit 110 may not be up-to-date with the version of the software stored in the cloud databases 140. In another example, the version of the software stored in the local storage unit 110 may be proprietary to the user, which the user may want to limit or restrict its use to only the user and/or the user's affiliates (e.g., a unique build material, or protected fabrication process, etc.).

Electronic system 100 may also include one or a combination of wired and/or wireless electronic networks. Network 100 may be comprised of a wireless network (employing, for example, wireless fidelity (WiFi) or satellite), a data network (e.g., a local area network (LAN), metropolitan area network (MAN), wide area network (WAN), the Internet, any packet-switched network, etc.), a private network, a public network, a cable network, etc.

In one embodiment, the user device 102 may be any type of computing device configured to send and receive different types of content and data to and from various computing devices via electronic system 100, such as, information stored electronically in the cloud databases 140. Examples of such a computing device include, but are not limited to, a desktop computer or workstation, a laptop computer, or any computing device having at least one processor, a local memory, a display (e.g., a monitor or touchscreen display, one or more user input devices, and a networking communication interface. The user input device 112 may include any type or combination of input/output devices, e.g., the user interface 114, such as a keyboard, touchpad, mouse, touchscreen, camera, and/or microphone.

The network environment of FIG. 1A, as previously described, includes a 3D fabrication system used for extrusion-based fabrication. A non-limiting example of extrusion-based fabrication may be referred to as bound metal deposition (or "BMD"). BMD is the type of extrusion-based fabrication possible using the STUDIO SYSTEM™, which is produced by Desktop Metal, Inc. (Burlington, Mass.). As previously taught herein, a plurality of parameters may be adjusted or tuned prior to BMD fabrication of a part in order to allow a user to predict geometric distortions (e.g., total shrinkage of a part) and maintain dimensional accuracy and repeatability in processed part dimensions. During an exemplary operation of a BMD fabrication system, one or more of these parameters may be used to ultimately transform a 3D model of a desired part for fabrication by the user, and according to aspects of the present disclosure. However, these parameters may be specific to the type of fabrication technique that is selected by the user. During BMD fabrication, the following non-exhaustive list of parameters may apply with respect to:

1) Handling and production of raw feedstock or build material, the degree of dimensional change may be affected by details that may include, but are not limited to:

characteristics of the discrete (powder) phase, such as, for example: powder chemistry, powder size distribution, powder morphology, motion of powder in response to imposed stress, stress transmitted by powder in response to imposed strain and/or rate of straining, powder tap density, retained moisture, surface chemistry of powder, adsorbed species on powder, and any other characteristic of the discrete (powder) phase;

characteristics of a continuous (polymer) phase such as ingredient types, proportion of the ingredient types, and any other characteristics of the continuous (polymer) phase; and characteristics of a mixing process such as duration of mixing, the temperature of mixing, the specific mixer/mixer geometry used during mixing, and any other characteristics of the mixing process.

2) Deposition characteristics of each layer, the degree of dimensional change may be affected by details that may include, but are not limited to:

a strand width and a strand height of a deposited strand;

an orientation and relative order in which a row or columns of strands are deposited;

a density, globally and locally, of deposited strands within a layer;

a temperature at which a build material is deposited;

a relative speed between a build object and a nozzle, through which a strand is extruded;

geometric extents of an object to be printed in the three cardinal directions defined by the axes of the printer (which, in some aspects, may be generally maintained in later stages of the fabrication process); and geometric extents within one layer of an object to be printed in the three cardinal directions defined by the axes of the printer (which, in some aspects, may be generally maintained in later stages of the fabrication process).

3) Debinding processes, the degree of dimensional change may be affected by details that may include, but are not limited to:

an initial temperature difference between a part and a debinding solvent;

a duration of a debinding process;

a strand width and a strand height of a deposited strand of material;

an orientation and relative order in which strands are deposited;

the countable interfaces between strands in a direction of the strand width;

the countable interfaces between strands in a direction of the strand height; and a density, globally and locally, of deposited strands within a layer;

the percentage of removable material within the deposited strand of material;

the degree of swelling or deformation induced by the debinding solvent when the part is brought into contact with the debinding solvent;

the drying procedure used to remove the debinding solvent from the part.

4) Sintering and/or thermal processes, the degree of dimensional change may be affected by details that may include, but are not limited to:

a time-temperature profile experienced by a part—both the average and local time-temperature profiles may be important;

a time-pressure profile experienced by a part;

a time-flowrate profile experienced by a part;

the gaseous species which are brought into contact with the part through flow and diffusion throughout the sintering process;

the presence, type, or amount of gettering materials inserted nearby, upstream, or downstream of the part which affect the chemistry within the sintering furnace;

friction between a part and its surroundings, and/or between sections of the part;

constraint imposed by dissimilar materials (e.g., the interface structure in BMD);

constraint imposed by sections of a part deposited at different volume fraction;

sintering discrete objects of non-identical composition within a powder bed, where, for example, the objects of non-identical composition may be introduced from at least two hoppers; and chemistry evolution in the part throughout a cycle—for example, by parameterizing a sintering cycle, e.g., by according to the impact of load and surface area of an object on the object chemistry.

With respect to a BMD fabrication system, such as that employed by 3D fabrication system 102, it can be appreciated that the above parameters may generally include physical printer characteristics, e.g., the nozzle size for print head, printing parameters that can be controlled at print time (e.g., volume rate of deposition), or printing parameters that indirectly specify properties of the printed object. This latter category may, for example, including slicing parameters that may be used to generate a tool path when creating machine-ready instructions for a printer based on a 3D model (e.g., STL model, CAD model or the like), such as infill density, infill geometry, layer height, bead width, number of shells, and so forth.

Figure 1B:
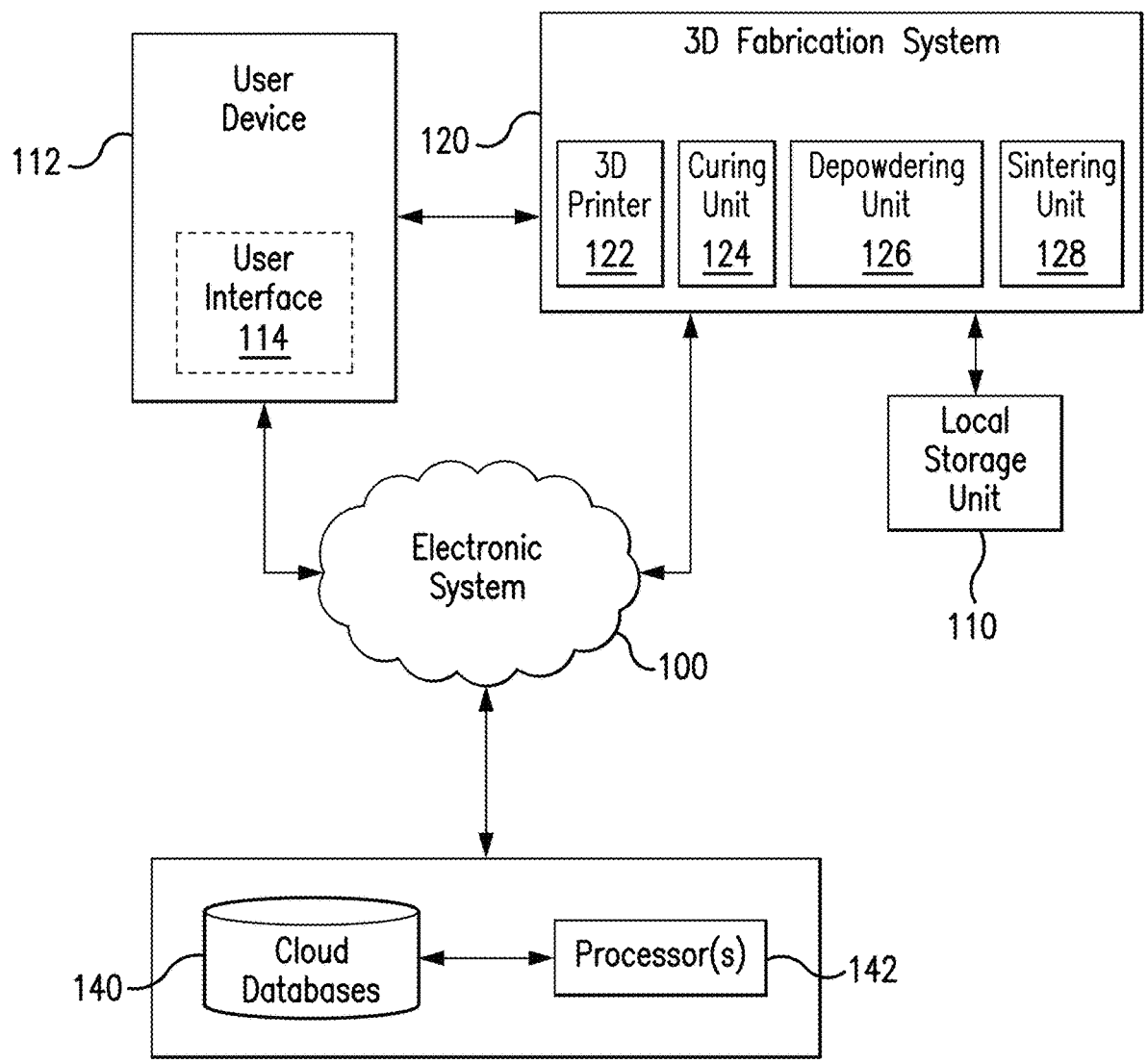
FIG. 1B is a schematic diagram of an exemplary network environment for adjusting a 3D model used in metal additive manufacturing using an exemplary 3D fabrication system (i.e., a powder-bed binder jetting fabrication system), according to an embodiment of the present disclosure.

FIG. 1B is a schematic diagram of a network environment in which various systems may adjust a 3D model used in metal additive manufacturing to maintain dimensional accuracy and repeatability of a fabricated 3D part, in which example embodiments may be implemented. As shown in FIG. 1B, the network environment may include a 3D fabrication system 120. The 3D fabrication system 120 may comprise a 3D printer 122, a curing unit 124, a depowdering unit 126, and a sintering unit or a thermal processing unit 128. The curing unit 124, the depowdering unit 126, and the sintering unit 128, individually or collectively, may be utilized by a user or operator for achieving one or more of the post-print, processing steps, as taught throughout the present disclosure. It can be appreciated that cross-linking may be performed by the thermal processing unit 128, at a step, according to an embodiment taught herein. The 3D fabrication system 120 is different from the 3D fabrication system 102 of FIG. 1A in that the 3D fabrication system 120 relates to a powder-bed binder jetting fabrication system, according to an embodiment of the present disclosure. One highly suitable powder-bed binder jetting 3D fabrication system is produced by Desktop Metal, Inc. (Burlington, Mass.) and marketed as the PRODUCTION SYSTEM™. A non-limiting example of powder-bed binder jetting fabrication may be referred to as single pass jetting (or "SPJ"). SPJ is the type of powder-bed binder jetting fabrication possible using the PRODUCTION SYSTEM™, which is produced by Desktop Metal, Inc. (Burlington, Mass.). According to aspects of the present disclosure, and the embodiments described herein, a plurality of parameters may be adjusted or tuned prior to SPJ fabrication of a part in order to allow a user to predict geometric distortions (e.g., total shrinkage of a part) and maintain dimensional accuracy and repeatability in processed part dimensions. During an exemplary operation of an SPJ fabrication system, one or more of these parameters may be used to ultimately transform a 3D model of a desired part for fabrication by the user, and according to aspects of the present disclosure. However, as previously described, these parameters may be specific to the type of fabrication technique that is selected by the user. During binder-jetting fabrication techniques, such as SPJ, the following non-exhaustive list of parameters may apply with respect to:

1) Handling and production of raw feedstock or build material, the degree of dimensional change may be affected by details that may include, but are not limited to:
  characteristics of a discrete (powder) phase, such as, for example: powder chemistry, powder size distribution, powder morphology, motion of powder in response to imposed stress, stress transmitted by powder in response to imposed strain and/or rate of straining, powder tap density, retained moisture, surface chemistry of powder, adsorbed species on powder, and any other characteristic of the discrete (powder) phase;
  characteristics of a powder conveyance mechanism such as transport geometry and equipment used to transport the powder, duration of transport, parameters settable by the conveyance mechanism, mixing and blending after material transport, and any other characteristics of the powder conveyance mechanism; and
  characteristics of a powder preparation, such as, for example, heating of the powder, storage of the powder within an enclosure at a defined or measured state (e.g., temperature, humidity, gas atmosphere), re-use of powder (e.g., powder recycling), mixing of the powder (including the specific geometry of the mixer, duration of mixing, mixing schedule), and any other characteristics related to a powder preparation. It can be appreciated that this may also or instead include measurements of the powder rheology, flowability, or other powder characteristics prior to use, during use, or some combination thereof.

2) Deposition characteristics of each layer, the degree of dimensional change may be affected by details that may include, but are not limited to:
  an intended or measured layer thickness of a powder;
  if two or more materials are being deposited (e.g., two metal powders), the ratio of the two powders either intended or measured to be deposited;
  a geometry and/or configurable settings of the powder metering and leveling or compaction instrument (e.g., roller); including, but not limited to: a height of a powder to be spread, a rate of accumulation of a powder in advance of a leveling instrument, a direction of rotation of the roller, a rotation rate of a leveling roller, a rate of linear translation of the leveling roller, a material of construction of a levelling roller, a surface finish of a levelling roller, a diameter of the leveling roller or other leveling instrument, and controllable feedback variables which control the leveling roller. This list should be understood to apply to a specific leveling roller, and other characteristics may be included as the powder spreader/leveling roller is modified;
  an action of a pre-binding agent or a process (e.g., a steamer or other condensation);
  a linear speed of a printhead depositing binding agent;
  a volume of binding agent deposited, per volume of the bed intending to be bound (e.g., saturation);
  a dithering pattern used to control a volume of binding agent deposited;
  a droplet size ejected from a printhead to deposit a binding agent;
  a specific binding agent used;
  an orientation of a printed object within a bed, both absolutely and as compared to the sintering orientation of the printed object;
  a distance from other printed objects within a bed; and
  a controlled environment inside the printer (e.g., relative humidity, temperature, oxygen concentration).

3) Curing processes, the degree of dimensional change may be affected by details that may include, but are not limited to:
  a time temperature profile;
  a controlled environment inside the curing oven (e.g., relative humidity, temperature, oxygen concentration); and
  a time-pressure profile experienced by a part.

4) Sintering and/or thermal processes, the degree of dimensional change may be affected by details that may include, but are not limited to:
  a time-temperature profile experienced by a part—both the average and local time-temperature profiles may be important;
  a time-pressure profile experienced by a part;
  a controlled environment inside the furnace (e.g., relative humidity, temperature, oxygen concentration), or a time profile of environmental conditions within the furnace (e.g., oxygen concentration versus time or temperature);
  friction between a part and its surroundings, and/or between sections of the part;
  constraint imposed by dissimilar materials (e.g., the interface layer in SPJ);
  constraint imposed by sections of a part deposited at different volume fraction;
  sintering discrete objects of non-identical composition within a powder bed, where, for example, the objects of non-identical composition may be introduced from at least two hoppers; and
  chemistry evolution in the part throughout a cycle—for example, by parameterizing a sintering cycle, e.g., by according to the impact of load and surface area of an object on the object chemistry.

With respect to a SPJ fabrication system, such as that employed by 3D fabrication system 102, it can be appreciated that the above parameters may generally include physical printer characteristics, e.g., leveling roller size for powder spreading, printing parameters that can be controlled at print time (e.g., layer thickness), or printing parameters that indirectly specify properties of the printed object. This latter category may, for example, including slicing parameters that may used to generate a tool path when creating machine-ready instructions for a printer based on a 3D model (e.g., STL model, CAD model or the like), such as amount of binder deposited, amount of steam/water vapor condensed, and so forth.

Figure 2A:
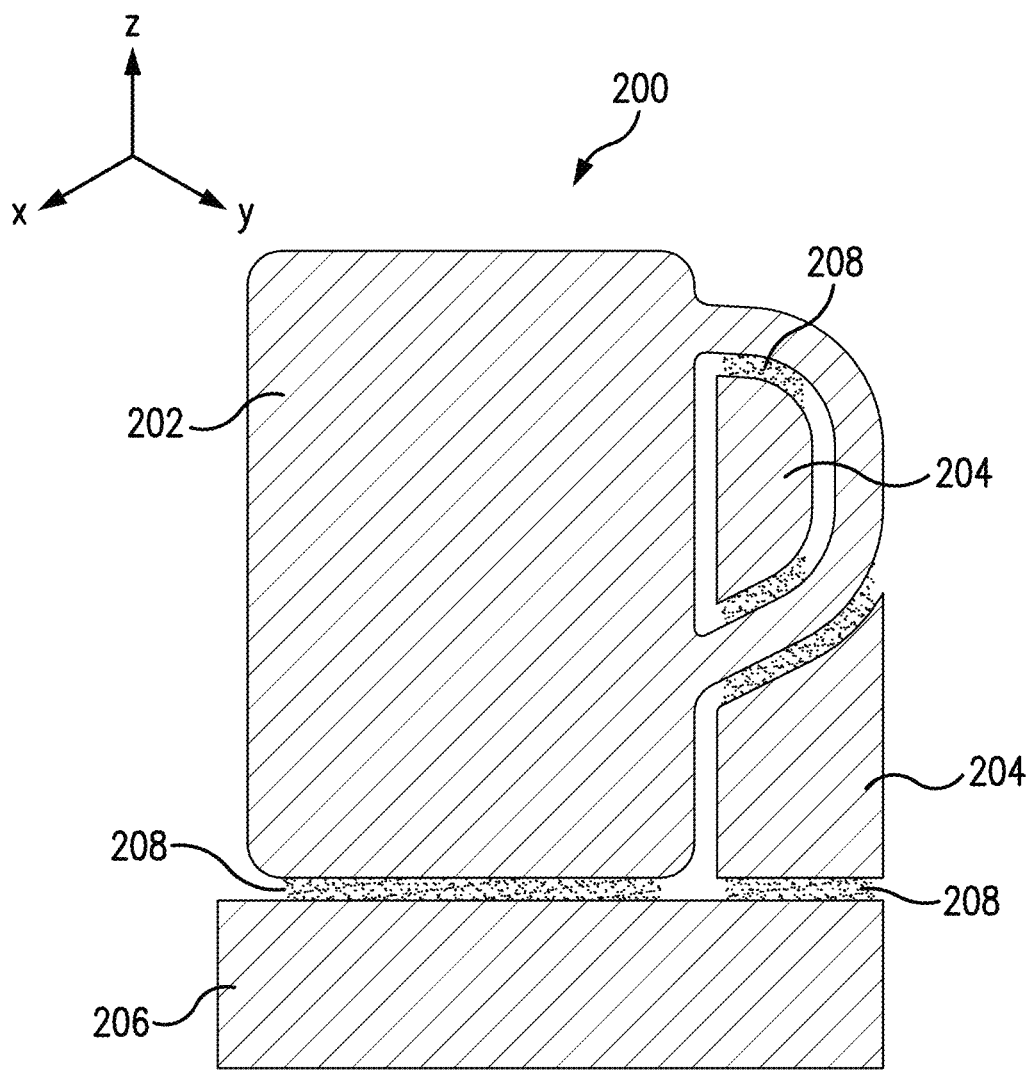
FIG. 2A is an illustrative example of a 3D model part to be fabricated, according to an embodiment of the present disclosure.
Figure 2B:
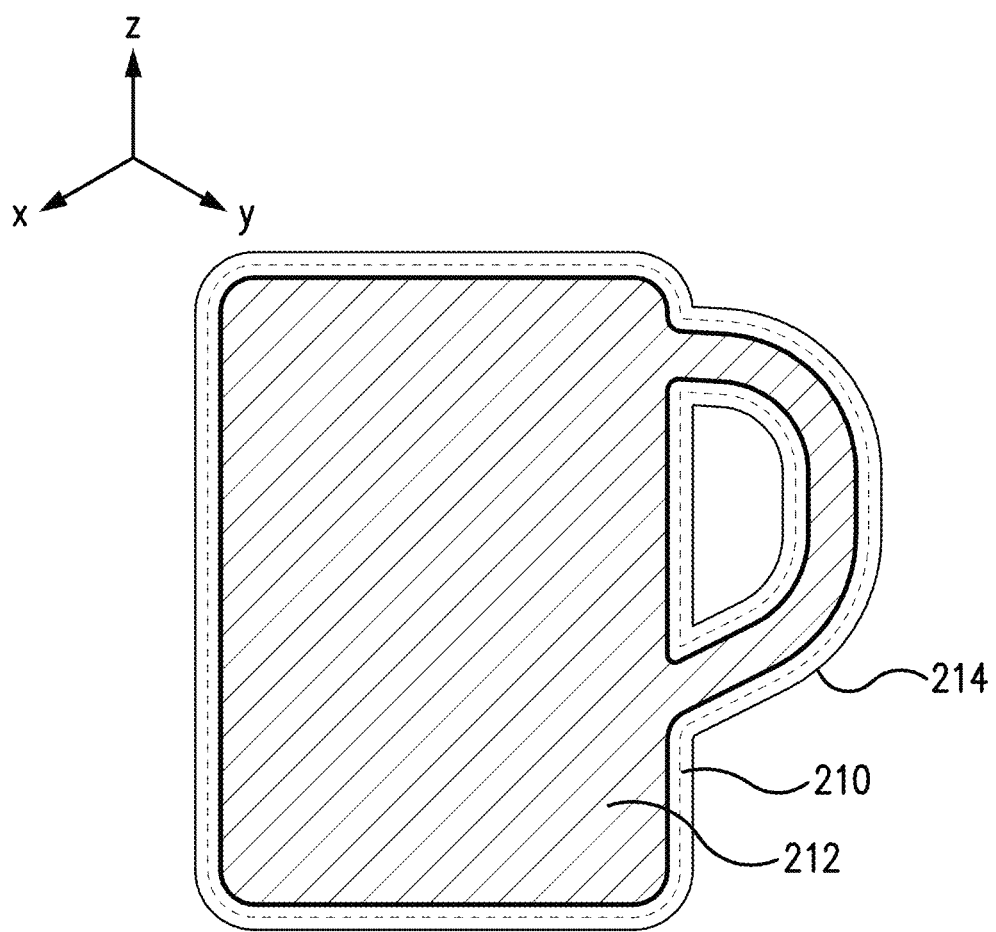
FIG. 2B illustrates an example of a transformation (e.g., scaling, adjustment, etc.) to the 3D model part of FIG. 2A that may be employed to correct for geometric distortions (e.g., shrinkage), during a fabrication process, according to an embodiment of the present disclosure.

FIGS. 2A-2B illustrates an example of a 3D model part 200 to be fabricated according to one of the 3D fabrication systems described herein, and according to embodiments of the present disclosure. FIG. 2A depicts the 3D model (e.g., STL, CAD, etc.) 200 in the shape of a coffee cup. At a step, described later in this disclosure, a user imports the 3D model 200 of the coffee cup into the 3D fabrication system. The 3D model 200, as shown, includes additional features besides the part desired (i.e., coffee cup 202); thus, an imported 3D model, according to embodiments described throughout the present disclosure, includes, collectively, the desired part to be printed and the additional intervening and support structures. These additional structures may be a plurality of support structures 204, a raft 206, and multiple interface structures 208, as illustrated. As shown in FIG. 2A, interfaces structures 208 are disposed between a surface of the part 202 and a surface of the support structure 204, and also between a surface of the part 202 and a surface of a raft 206. In the embodiment shown, the 3D model of the coffee cup 202, the support structures 204, and the raft 206 are comprised of the same material, such as, for example, a metal. In alternate embodiments, however, the part to be fabricated (e.g., cup 202), the support structures 204, and the raft 206 may be formed from different material, such as, for example, the part 202 formed from metal A, the support structure 204 formed from metal B, and the raft 206 from metal C, or any other combination of different metals. In the embodiment shown in FIG. 2A, the interface structures 208 are comprised of a material different from parts 202, 204, and 206, such as, for example, a ceramic. Interface structure 208, in another exemplary embodiment, may also be formed from polymer, or any other material that will weaken during a sintering processing step to permit a user to detach the 3D desired part 202 from the support structures 204 and the raft 206.

Figure 3:
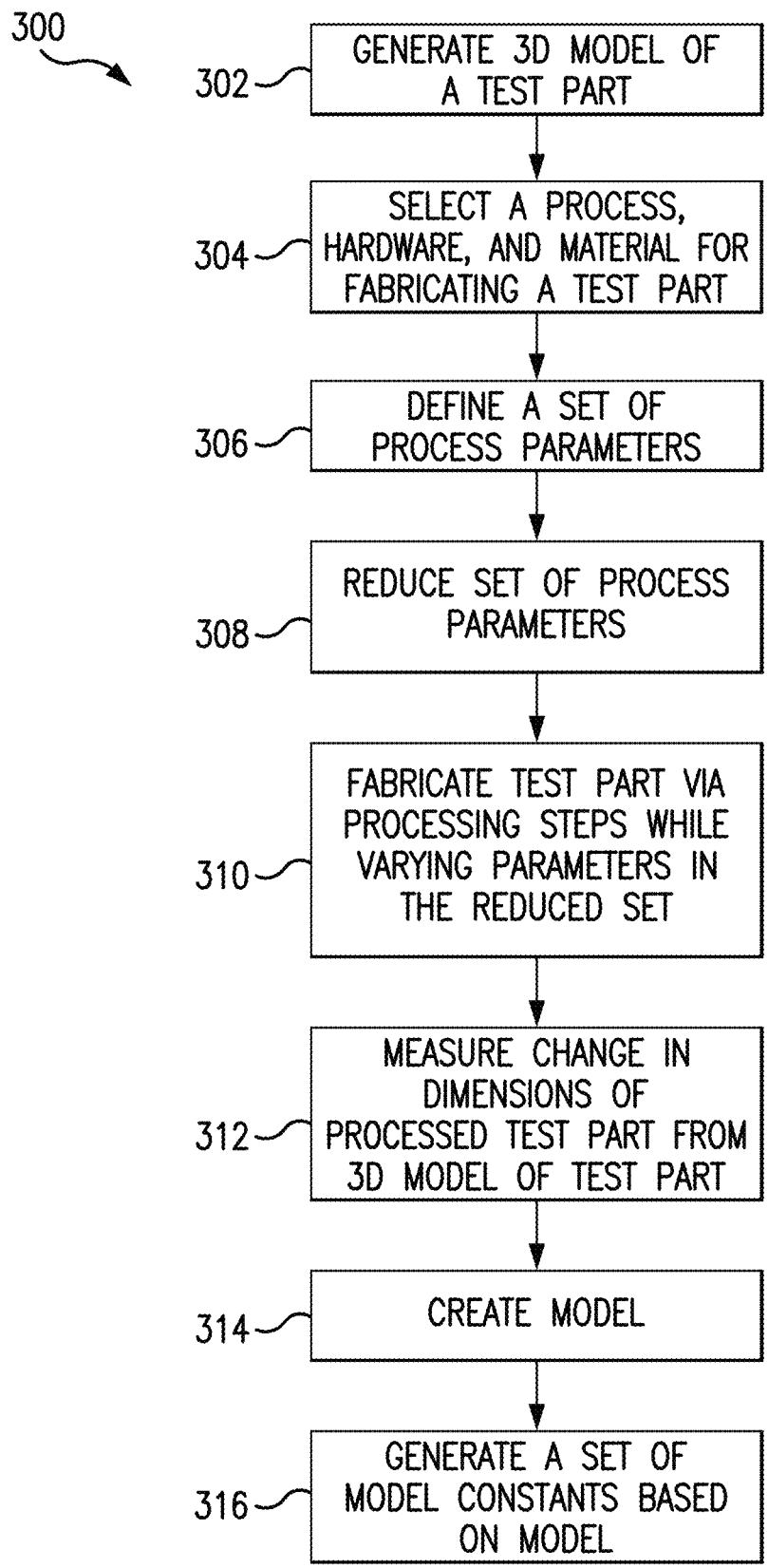
FIG. 3 is a flow diagram of an exemplary process for determining model constants (e.g., regression constants), according an embodiment of the present disclosure.

With reference now to FIG. 2B, an exemplary transformed 3D model of the 3D model 200, of FIG. 2A, is depicted. A user, during an exemplary operation of the 3D fabrication systems described herein, may wish to fabricate a part using a specific 3D model. In the embodiment shown, shape 210 (shown as a dashed contour line) represents a desired part the user intends to print. Shape 212 (shown as a bolded contour line) represents an actual printed part (e.g., a coffee cup); however, having undergone a geometric deformation (e.g., a shrinkage, a sagging, etc.), the actual printed part is smaller than the intended desired part 210. Consequently, a user may wish to employ the one or more systems and methods, as taught herein, to compensate, predict, or otherwise account for the predictable geometric deformation or error prior to fabricating the coffee cup part. In other words, a user may wish to utilize the processes taught herein to adjust a 3D model to maintain dimensional accuracy without part deformation (e.g., shrinkage). Shape 214 (shown as a thin contour line) represents an adjusted or transformed 3D model based on the adjustment processes (e.g., a transformation, parameterized scaling, an adjusted CAD model, etc.) taught herein. An exemplary process will be described with respect to FIG. 5 later in this disclosure. this Prior to implementation of the exemplary process of FIG. 5 to generate a transformed 3D model, as taught herein, a set of model constants (e.g., regression constants) must be obtained. In one embodiment, the model constants may be referred to as model coefficients. For example, with reference now to the flow diagram of FIG. 3, an exemplary process 300 for generating a set of model coefficients (e.g., regression constants) is illustrated, according to an embodiment of the present disclosure. This process may be computer-executable software stored as a code in a database or local storage unit and may be operatively connected to at least one processor for executing the code. At a first step 302, a 3D model (e.g., STL file, CAD drawing, or other 3D electronic representation) of a test part is generated. An example of a test part may be a cube with dimensions of 10 mm by 10 mm by 10 mm. The 3D model of the test part may be selected. At a step 304, a process, hardware, and a material for fabricating the test part is selected. The process may refer to any one of the variable, tunable, adjustable parameters taught herein in relation to the various 3D fabrication systems taught herein (e.g., BMD, SPJ, or any other relevant system comprising 3D printing and post-processing). For example, in an exemplary operation of the SPJ system, the process selected may refer to a part being set to print at 65 microns per layer (i.e., thickness of the spread layer) with a 1200 dpi resolution. Yet, in another example, in an exemplary operation of the BMD system, the process selected may refer to a part being set to print at 200 microns per layer with a strand width of 480 microns. The hardware selection may refer to any component in a 3D fabrication system taught herein. For example, hardware may refer to a desired nozzle from a plurality of nozzles, a desired furnace from a plurality of furnaces, or any other related desired component used to physically fabricate a 3D part. Selection of the hardware may also refer to the generation of the component selected (e.g., a first-generation furnace versus a second-generation furnace, a second-generation nozzle versus a fourth-generation nozzle, versus a choice of orifice size for any given generation of nozzle, etc.). Lastly, selection of the material for fabrication of a test part may refer to the material used during fabrication of the part, the raft, the support structure(s) (e.g., one or more metals, a combination of metals, etc.) and the material used during fabrication of the interface structures (e.g., one or more ceramics). In one embodiment, the ceramic of the interface structure may be automatically selected based on the selection of the metal used to fabricate the desired 3D test part. In an exemplary embodiment, the material selected for the part, the raft, and/or the support structure(s) may be selected from either stainless steel or non-stainless steel. In some embodiments, the material selected for the part may be a 17-4 PH stainless steel, a 316L stainless steel, a 4140 cobalt chromoly steel, an H13 tool steel, an A2 tool steel, a D2 tool steel, a copper-based material, a cobalt-based material, an aluminum-based material, a nickel-based material, or a similar material. In some embodiments, a combination of these materials may be selected.

Thereafter, at a step 306, a set of process parameters are defined. In an exemplary embodiment, the defined set may include over 100 process parameters. This set of process parameters may include any one of the parameters described previously in this disclosure. The defined set may also be stored as a library, a look-up table, or in some other related format in a storage unit (e.g., database, local storage device, etc.). At a step 308, the defined set of process parameters may be reduced to a reduced set of parameters. For example, in one embodiment, from a library of 100 process parameter variables, a reduction to five (5) of the more significant or critical process parameters for maintaining dimensional accuracy and/or for offsetting a predictable geometric distortion in the test part (e.g., shrinkage caused by printing and post-processing fabrication steps) may occur. In an exemplary embodiment, the set of process parameters may be reduced by 1) guaranteeing tolerances for a specific subset of parameters, or 2) by determining the most sensitive parameters, or some combination of 1 and 2. In other embodiments, the set of process parameters may be reduced by considering user demand and/or user preference.

At a step 310, once the reduced set of process parameters is established, the test part is fabricated via the fabrication processing steps (e.g., printing, debinding, sintering, etc.) as taught herein while also varying the process parameters in the reduced set, for example, in a controlled manner such as a Design of Experiments (DOE). For example, if the process parameter in the reduced set was to print a strand/bead of material at a specific strand/bead height or rate of deposition, then the test part would be fabricated in accordance with this adjusted variable process parameter. At a step 310, once the test part is fabricated (e.g., printing and post-processing steps have been completed on the test part) a change in dimensions of the processed test part is measured from the original 3D model of the test part from step 302. This measurement may be employed using a coordinate measuring machine, a laser displacement sensor, 2D scanners, a structured light scanner, other 3D scanners, calipers, micrometers, or other suitable measuring apparatus. In an exemplary embodiment, the change in dimensions is measured first along an X-Y plane of the test part, and separately measured again along a Z-axis of the test part. In other embodiments, measurements may be made to quantify the change in dimension along a specific direction of a part (e.g., X, Y, and Z-axes) and within specific feature types (e.g., features of an aspect ratio of X distance to Y distance, or XY distance to Z distance, or overhangs, or interior features, such as holes or other embossed regions). At a step 314, a model may be created, such as, for example, a regression analysis, a mechanistic approach, or a combination thereof. In one embodiment, the model may be created based on collected measurements of a test part(s). In an exemplary embodiment, and according to aspects taught herein, the model may be created to predict the change in dimension for a fabricated part. It should be appreciated that, in some embodiments, a model may be at least a regression. A regression may refer to a set of data points, where a line, curve, or more generally, a surface in N dimensions that minimizes the residual error for the set of data points best. In an exemplary embodiment, the regression model may take the form of a Taylor-series expansion where linear variations in process variables are considered (e.g., a model of the form $F(x,y,z)=F(x\_0,y\_0,z\_0)+a*(x-x\_0)+b*(y-y\_0)+c*(z-z\_0)$ where F is the model output for parameter variables with values x, y, z, constants a,b,c and a constant $F(x\_0,y\_0,z\_0)$ for fixed values of the parameter variables x,y,z). In another embodiment, the regression may include both the linear variation in process variables (as taught in the previous embodiment) as well as products of the variations of multiple process variables into themselves and one another (sometimes considered as 'mixed' or 'quadratic' terms, e.g., $F(x,y,z)=F(x\_0,y\_0,z\_0)+a*(x-x\_0)+b*(y-y\_0)+c*(z-z\_0)+d*(x-x\_0)*(x-x\_0)+e*(x-x\_0)*(y-y\_0)$ . . . where the symbols repeated above have the same meaning, d is a constant for the quadratic term of x and e is a constant for the mixture term of x and y, and the ellipses " . . . " represent the presence of further mixture and quadratic terms). In further embodiments, the model or regression may be of any of the form as specified in "Statistics for Experimenters" $2^{nd}$ Edition by Box, Hunter, and Hunter, which is incorporated by reference herein. In further embodiments, the model may provide a specific constant offset in a cardinal dimension based upon a parameter value (e.g., the value of a continuous variable identified within a specific range of values, or parameter state (e.g., on/off)).

In an exemplary embodiment, the model (e.g., regression analysis model) may be constructed to measure the change in shape or dimensions of the processed test part in comparison to the originally presented 3D model (i.e., prior to any fabrication step) of the test part. In an exemplary embodiment, the constructed model may be used to calculate the geometric distortions (e.g., shrinkage, or any other distortion) of each cardinal dimension, or a combination of the cardinal dimensions, of the fabricated test part (e.g., processed test part) for each feature of interest (e.g., a hole or other embossed feature, a feature of large aspect ratio in the X-, Y-, or Z-direction, an overhanging feature, etc.) in comparison to the originally presented 3D test part. As an example, these measurements may be measured on a percentage basis (e.g., % of total shrinkage). In some embodiments, these measurements may be made on an absolute basis. In yet other embodiments, these measurements may be made by a combination of an absolute basis and a percentage basis (e.g., % of total shrinkage).

It should be appreciated that the fabrication step 310, the measurement step 312, and the create model step 314 may differ between the BMD and SPJ 3D fabrication systems taught herein. BMD fabrication may include printing, debinding, and sintering, while other fabrication systems may not utilize all three of these fabrication steps. For example, during fabrication of a test part using an SPJ fabrication system, a different fabrication step 310 may be necessary. For example, when utilizing an SPJ fabrication system, a test part may be printed, cured, depowdered, and sintered—this system does not require a chemical debinding step. However, it should be appreciated that both BMD and SPJ fabrication techniques may require a thermal debinding step. Consequently, a different measurement step 314 may be necessary when using an SPJ fabrication system. For example, in SPJ fabrication of a test part, a first measurement may be taken of the green part, allowing calculation of the dimensional result of the first fabrication steps (e.g., printing and curing); and a second measurement may be taken of the sintered part, allowing calculation of the dimensional change during subsequent processing (e.g., sintering). As a result of varying fabrication and measurement steps 310 and 312, respectively, between the BMD system and the SPJ system, the SPJ system, therefore, yields a different create model step than the create model step 314 in the BMD system.

At a final step 316, a set of model constants or coefficients may be generated based on the model created at step 314. In an embodiment, the model constants may be any value that appears in an expression, such as, for example, an equation or function, or a value in a table as determined by the categorical selection of a process parameter (or parameters), or range of the process parameter (or parameters), or a value determined by the satisfaction of a series of logical operations (e.g., if parameter "A" is less than a specific value "V", then the constant has the value "G"; or if the parameter "A" is greater than or equal to the specific value "V", then the constant has the value "H", etc.).

In an alternate embodiment, the create model step 314 may be executed to create the model, a priori, tests are run, in which case a model (e.g., regression) may be performed with the data collected. In such a scenario, it may be possible step 314 to occur earlier in the process 300.

For example, in an exemplary embodiment, a set of regression constants may be generated based on a regression model created in a prior step. These model constants (e.g., regression constants) may be used to determine 1) the sensitivity of the fabrication process to the reduced set of process parameter (e.g., at step 308), 2) the amount by which a part dimension varies, and 3) the degree to which a part must be modified prior to fabrication.

FIG. 4A is a flow diagram of an exemplary fabrication process 400 for fabricating a desired, processed 3D part from a 3D model, according to an embodiment of the present disclosure. Fabrication process 400 corresponds to the BMD 3D fabrication system described in the present disclosure. A 3D model of a desired part 406 is first generated. The 3D model of the desired part is subsequently printed. The printed part is referred to as a green part 410. During operation of the BMD 3D fabrication system, the green part then undergoes a first post-print, processing step to debind the part and remove a primary binder in the green part 410. In some embodiments, a secondary binder may remain to continue to hold the printed part together. This debound part may be referred to as a brown part 412. Finally, the brown part 412 is subsequently sintered in a second processing step, via a sintering unit or a furnace (represented as thermal processing unit 108 in FIG. 1A), to produce a sintered part 414. According to aspects of the present disclosure, it may be necessary to determine the amount of geometric distortion (e.g., shrinkage) during the fabrication process 400. For example, FIGS. 4B-4C illustrate exemplary equations 410 and 420 for measuring total deviation (e.g., shrinkage) as a matter of percentage and for measuring the total shrinkage error, respectively. As depicted, the total deviation (e.g., shrinkage) may be calculated in two parts. The first part, 402, may measure the % deviation (e.g., shrinkage) of the green part from the 3D model. The second part, 404, may measure the % deviation (e.g., shrinkage) of the sintered part from the green part. Total deviation (e.g., shrinkage) may refer to the amount of shrinkage in dimensions (e.g., X-, Y-, Z-axes) of length which may be added. Total percentage (%) deviation (e.g., shrinkage) may then be multiplied. In one embodiment, equations 410 and 420, among others, may be used, for example, during step 312 in FIG. 3 to determine the deviation (i.e., overall change in shape or size) of a processed test part from the originally presented 3D model of the test part, such as, for example, shrinkage. Equations 410 and 420 are exemplary. Other equations, calculations, measurements, or steps may be employed to measure the change in dimensions, as recited in step 312 of FIG. 3.

Figure 5:
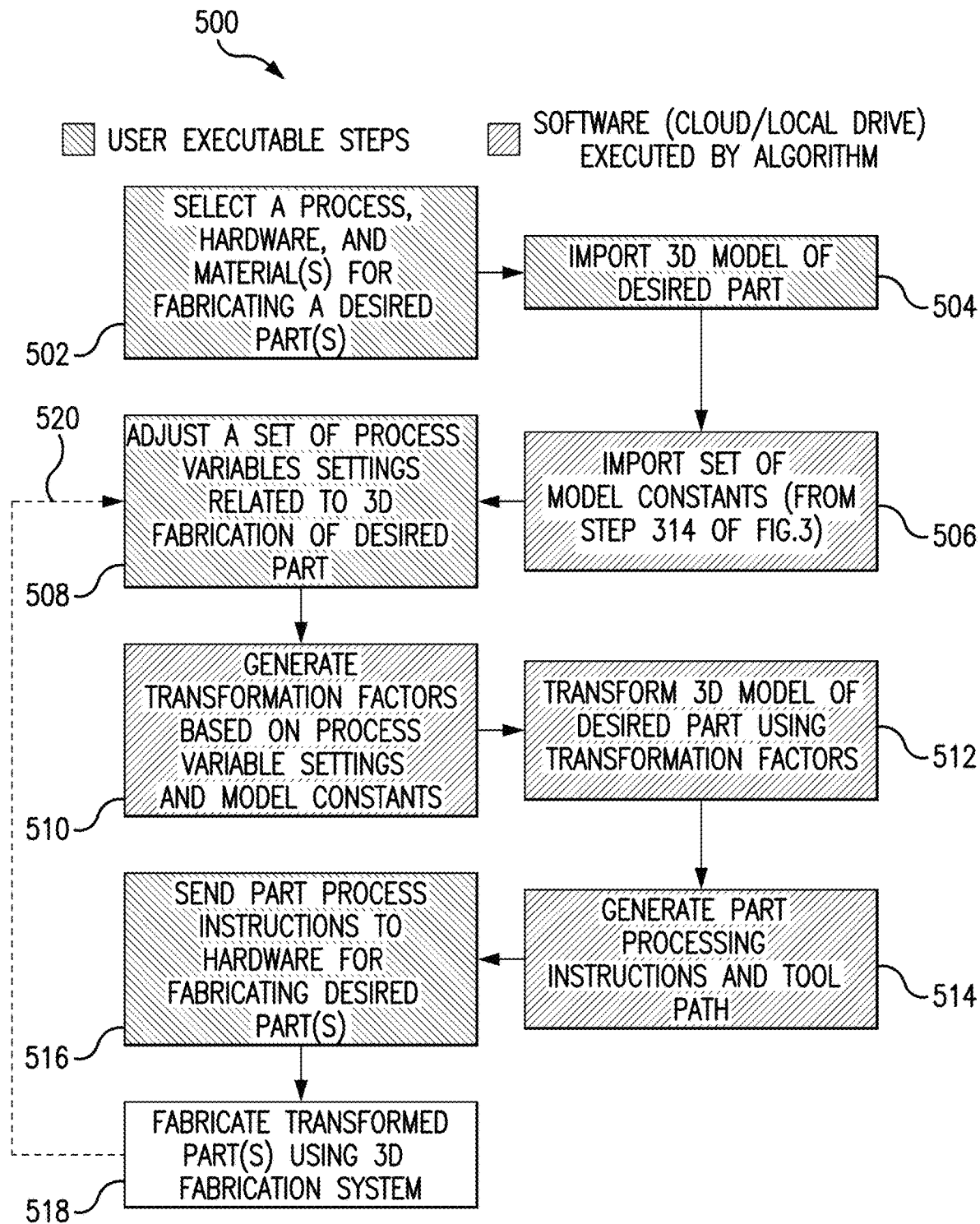
FIG. 5 is a flow diagram of an exemplary process for adjusting a three-dimensional (3D) model used in metal additive manufacturing to maintain dimensional accuracy and repeatability of a 3D fabricated part (e.g., printed, debinded, sintered, cross-linked, cured, depowdered part, etc.), according to an embodiment of the present disclosure.

With reference now to FIG. 5, a flow diagram of an exemplary process 500 for adjusting a three-dimensional (3D) model used in metal additive manufacturing to maintain dimensional accuracy and repeatability of a 3D fabricated part. In an exemplary embodiment, a fabricated part may refer to any part that includes one or more the following processing steps: printing, debinding, sintering, cross-linking, curing, depowdering, or any other fabrication process used in metal additive manufacturing. 3D models used during operation of either a BMD fabrication system (e.g., 3D fabrication system 102 of FIG. 1A) or an SPJ fabrication (e.g., fabrication system 120 of FIG. 1B), as taught herein, may be adjusted using the exemplary process 500 delineated in FIG. 5. It can be appreciated that during fabrication of a part using an SPJ 3D fabrication system, a user may have the additional autonomy, at a step, in preparation of a material.

At a step 502, a user may initially make a process selection, a hardware selection, and a material selection for fabricating a desired 3D part(s). In one embodiment, the user may input the selection via the user interface 114 of the user device 112. In another embodiment, the user may input the selection directly into a display interface (e.g., touchscreen, etc.) of one or more of the units illustrated and described in the 3D fabrication system 102 of FIG. 1A or the 3D fabrication system 120 of FIG. 1B. As previously described with respect to step 304 in FIG. 3, a process selection may refer to any one of the variable, tunable, adjustable parameters taught herein in relation to the 3D fabrication systems described herein. In some embodiments, a process selection may refer to selection of an SPJ versus BMD fabrication system, or some other fabrication system. The hardware selection may refer to any component in a 3D fabrication system taught herein, and as previously described with respect to step 304 in FIG. 3. The material selection may refer any selection of a material used during fabrication of a 3D part. For example, the material selected may refer to the material used during deposition of the part, the raft, the support structure(s), and/or the interface structure(s) as taught herein, and as previously described with respect to step 304 in FIG. 3.

At a step 504, a user may import a 3D model of a desired part for fabrication. For example, a user may import the 3D model described and shown with respect to FIG. 2A. In an exemplary embodiment, a user may import an STL file or CAD file representative of the desired part the user intends to fabricate. At a step 506, the algorithm stored in either the cloud databases 140 or the local storage unit 110 may automatically import, via a computer-executable step, the set of model constants generated at step 314 of FIG. 3. The set of model constants imported by the algorithm are dependent on the selection made by the user at steps 502 and 504. For example, in an exemplary embodiment, the model constants are imported once the user makes a specific process selection, a specific hardware selection, and a specific hardware selection, and also imports the 3D model file of the part the user intends to fabricate.

At a step 508, the user may then selectively adjust a set of process variable settings related to the 3D fabrication of the desired part the user intends to fabricate. The set of process variable settings may refer to any one of the variable parameters described throughout the present disclosure. For example, the user may select a rate of deposition of a material to be deposited during printing, a height of a deposited strand of material, the temperature of the material during deposition, the density of strands in a layer of deposited material during fabrication, etc. Once the set of process variable settings are adjusted by the user, at a next step 510, the algorithm may generate one or more transformation factors based on 1) the adjusted process variable settings made by the user, and 2) the imported model constants. In one embodiment, the transformation factors may be scaling factors. In another embodiment, the transformation factors may include at least one of scaling factors and/or constant offsets to at least one model dimension and/or at least one model direction. At a step 512, the 3D model of the desired part the user intends to print is then transformed using the one or more generated transformation factors. In an exemplary embodiment, as the 3D part is transformed, the dependent variable is the transformation factors, while the independent variable is at least the process variable settings. In such a scenario, by permitting the user to vary or adjust the values of the process variable settings, the adjustment process 500 may ensure that the predictable geometric distortions (e.g., such as shrinking of a part in an X-Y plane, or along a Z-axis, etc.) are compensated for.

A transformation may refer to a change in the geometry of the 3D model part such that the change may occur in a linear or non-linear way. A transformation may generally be referred to as the way in which a 3D model of a part is modified. In one embodiment, the transformation may be at least one of: a scaling operation, an offsetting operation (e.g., to grow or erode a part), a shearing operation, a rotation operation, a stretching operation, a squeezing operation, etc. For example, the transformation may enlarge or change a shape of the 3D model, shown by illustrative example, by the enlarged contour line 214 in FIG. 2B to compensate for a predicted shrinkage of the desired part (i.e., coffee cup). In an exemplary embodiment, the transformation may occur linearly along one or more of the X-, Y-, or Z-axes. In one embodiment, the transformation may include both a scaling operation and an offsetting operation. In one embodiment, the transformation may include several of a scaling operation, an offsetting operation (e.g., to grow or erode a part), a shearing operation, a rotation operation, a stretching operation, a squeezing operation, etc.

It can be appreciated that during operation of the BMD fabrication system, as each layer is created during an exemplary printing step, and depending on the process parameter(s) selected by the user (e.g., controlling a layer height, selecting a strand density, print speed, bead width, etc.), the desired part may shrink differently after thermal processing has occurred (e.g., after being exposed to elevated temperatures in a thermal processing unit, such as, for example, a furnace). For example, differences in shrinkage of dimensions in features aligned with the Z-axis versus in the X-Y plane of the fabricated part may be visible and/or measurable. Accordingly, as a taught herein, the transformation may be different within the X-Y plane than it might be along the Z-axis. In other words, according to an aspect of the present disclosure, a 3D model part may be adjusted or scaled in an X-Y plane, and then separately adjusted or scaled for the Z-axis. The adjustments in the X-Y plane and along the Z-axis may be achieved through iterative steps or in one step. In one embodiment, the transformation may include first an offsetting (e.g., reducing the dimensions of the part in the X-Y plane by 0.1 mm), followed by a scaling of the part (e.g., increasing the dimensions of the part in the X-Y plane by 15%).

Once the 3D model of the desired part to be printed is transformed, the exemplary process 500, at a step 514, may generate part processing instructions and generate a tool path. In a next step 516, the part process instructions and the tool path may be sent to hardware (e.g., a 3D fabrication system, as taught herein) for fabricating the desired part. In an exemplary embodiment, the algorithm may automatically generate these instructions based upon 1) the user-provided (e.g., user-supplied) 3D model selection, hardware and material selection, and process parameters (e.g., process variable settings) and 2) the transformation factors and model constants, as taught herein. In a final step 518, a user may fabricate the transformed 3D model using a 3D fabrication system. It can be appreciated that the transformed 3D model may now compensate for any predictable geometric distortions in the part. It can also be appreciated that the transformed 3D model has now adjusted the originally presented 3D model at step 504 in order to maintain dimensional accuracy and repeatability of the processed part dimensions. In doing so, the exemplary process 500 may be utilized by a user to enable the production of one-off parts accurately the first time they are processed by determining and capturing sensitive process parameters and feeding these parameters forward to appropriately transform (e.g., scale, offset, or scale and offset, etc.) the part before the part is fabricated.

In an exemplary embodiment, the process 500, as shown in FIG. 5, may be a linear process flow. However, in some embodiments, a user may choose to adjust a process variable setting during the fabrication process at a step 520. This process may be set up such that the transformation, as taught herein, may occur instantly, as the fabrication (e.g., printing) is still ongoing, to account for such changes as they occur. For example, a user may choose to change the amount of binder deposited partway through a SPJ print if an excessive amount of bleeding has occurred. In such an example, part way through the fabrication process 500, a user may adjust the process variable setting related to binder deposition. This may be represented as an additional step 520, which may occur as a loop, as shown in FIG. 5. In one embodiment, step 520 may be executed after step 518 begins (e.g., after fabrication of the transformed part has started), but before step 518 is completed (e.g., before fabrication of the transformed part is finished). In such an embodiment, step 520 returns the process 500 to step 508, where a user may then adjust one or more of the process variable settings. This additional step 520 may be performed iteratively and as many times as necessary to account for changes as they occur or step 520 may be performed by the user ad hoc.

In an exemplary embodiment, the exemplary process 500 may be used to predict transformation factors that may apply to all dimensions uniformly or may apply to different dimensions and/or to different locations within a desired part to be fabricated. In one embodiment, adjustment methods described throughout the present disclosure may be utilized by a user to bring a part within a predetermined error tolerance such as within 99% of measured part dimensions within a range of error, or with all measured part dimensions within 99% of a predicted value, or some combination of these. In another embodiment, adjustment methods described throughout the present disclosure may be utilized by a user to bring a part within a predetermined error tolerance such as within 95% of measured part dimensions within a range of error, or with all measured part dimensions within 95% of a predicted value, or some combination of these.

In a generalized approach, and according to embodiments of the present disclosure, a subset of parameters that are known or expected to have a substantial effect on shrinkage or dimensional tolerance may be identified and examined in detail to develop a mechanistic relationship for how each parameter affects part accuracy, either alone or in combination.

In one aspect of the present disclosure, the generated transformation factors may be implemented to depend upon the geometric extent and orientation of a desired 3D part to be printed.

Figure 6:
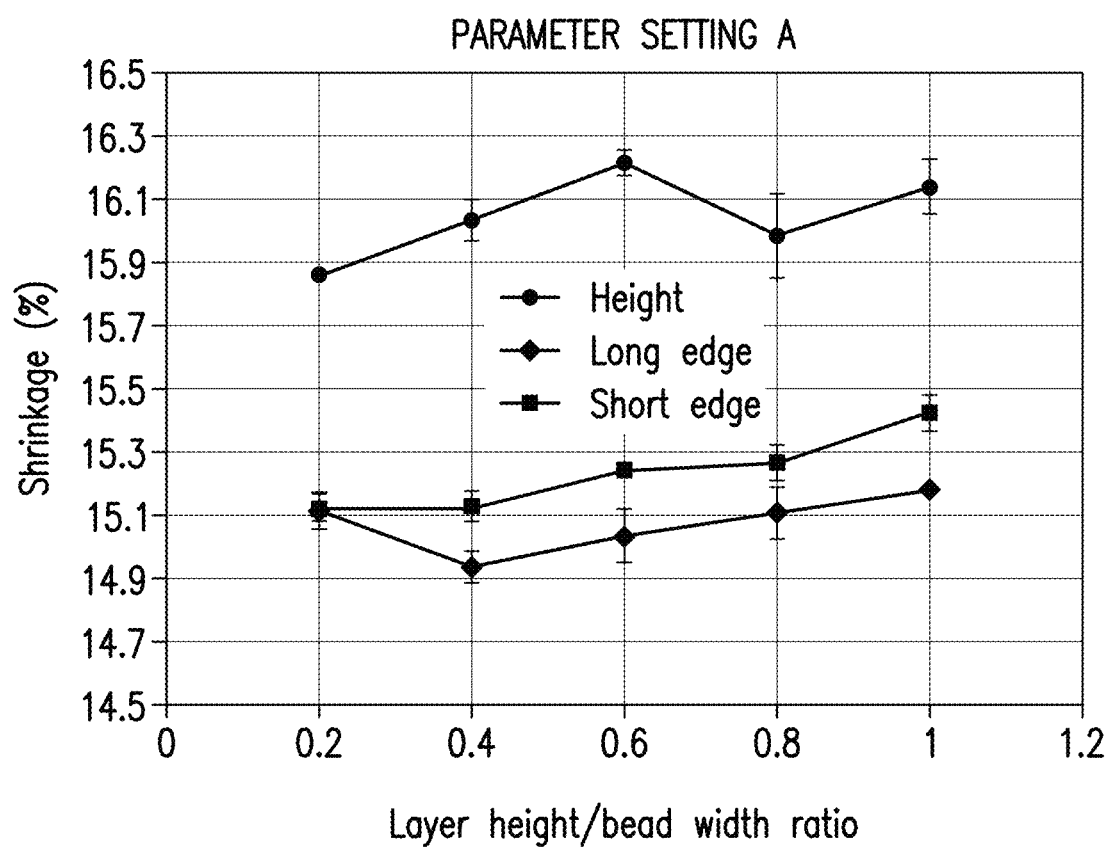
FIG. 6 is an exemplary graph illustrating an exemplary parameterized shrinkage based on experimental data using an exemplary 3D fabrication system (i.e., an extrusion-based fabrication system), according to an embodiment of the present disclosure.
Figure 7:
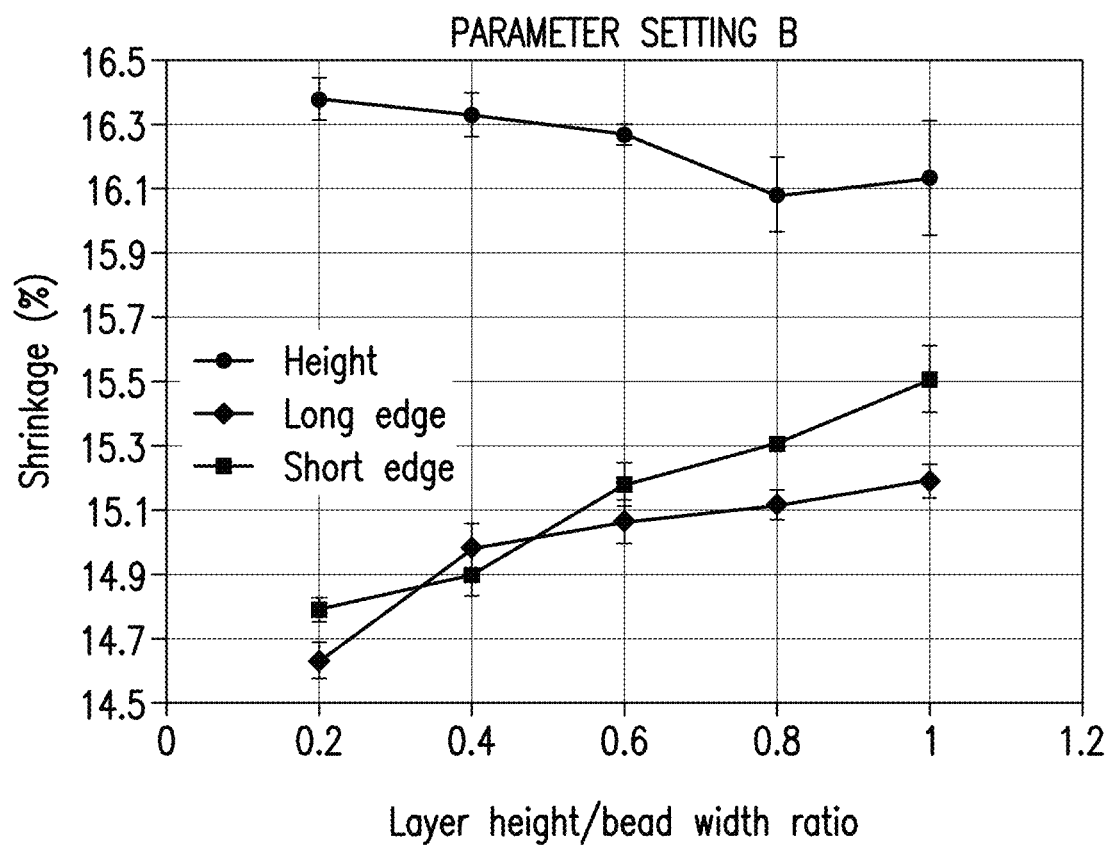
FIG. 7 is an exemplary graph illustrating an exemplary parameterized shrinkage based on experimental data using an exemplary 3D fabrication system (i.e., an extrusion-based fabrication system), according to an embodiment of the present disclosure.
Figure 8:
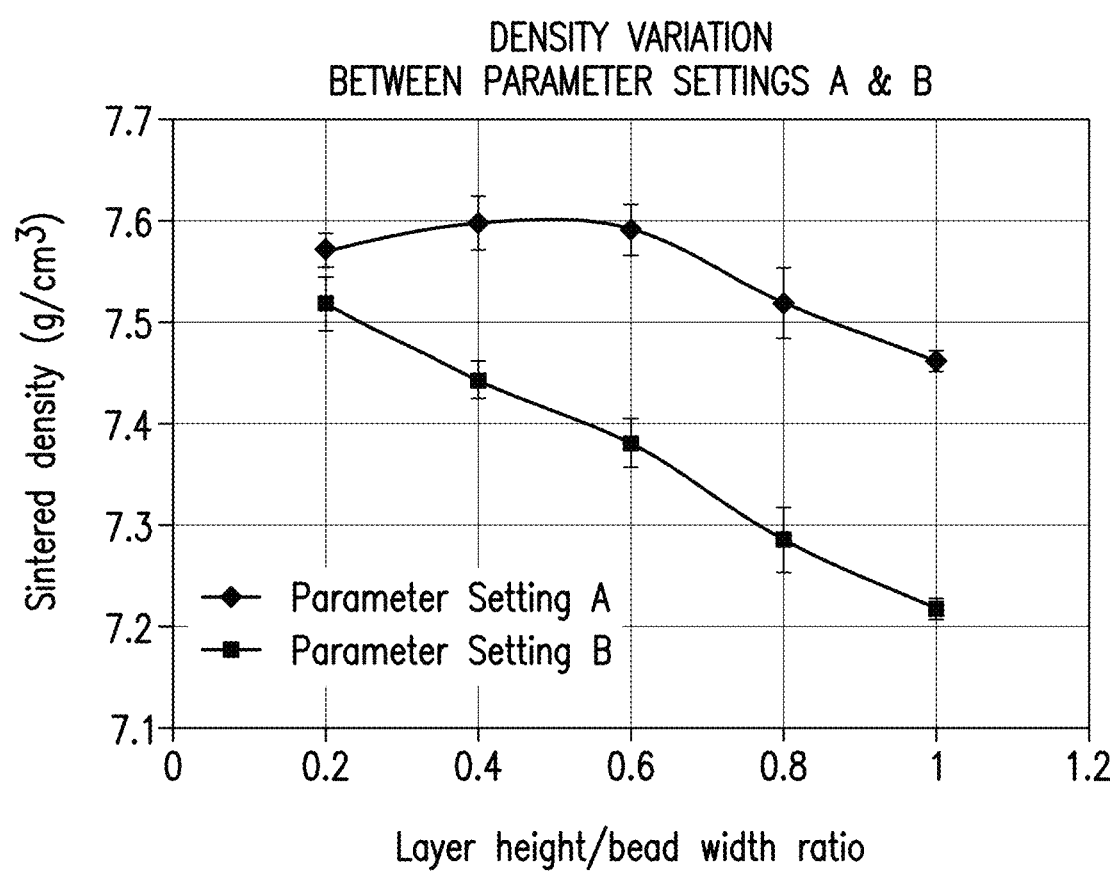
FIG. 8 is an exemplary graph illustrating an exemplary sintered density based on experimental data using an exemplary 3D fabrication system (i.e., an extrusion-based fabrication system), according to an embodiment of the present disclosure.

Without limiting the generality of the foregoing, an example of build-parameter specific object transformation (e.g., parameterized shrinkage) based on experimental data is depicted in FIGS. 6-8. In general, the shrinkage for an extruded object may vary with the build direction, and the ratio of the strand width to the strand height of the deposited build material. For example, the shrinkage may vary with respect to the build direction and the layer height to bead width ratio, and may also be different for different styles of toolpath. These dependencies are depicted by way of illustrative example in the plots shown in FIGS. 6-7. Each of FIGS. 6-7 is based on a selected process variable setting or parameter setting with % shrinkage as an output.

FIG. 6, for example, depicts a parameter setting "A" that is selected for an object having a height, a short edge, and a long edge (e.g., a rectangle). FIG. 6 depicts the percent shrinkage for a specific layer height to bead width ratio for a printed part. The long and short edges in FIG. 6 represent the dimensions of the object in the X-Y plane, whereas the height represents the Z-axis dimensions of the object. Parameter setting "A" in FIG. 6 is DOE. FIG. 6 demonstrates an appreciable shrinkage (%) in the Z-axis for parameter setting "A". Similarly, in FIG. 7, the percent shrinkage of a different parameter, parameter setting "B", is shown. FIG. 7 similarly depicts a percent shrinkage for a specific layer height to bead width ratio for a printed part. Parameter setting "B" is DM_XY. FIG. 7 also demonstrates an appreciable shrinkage (%) in the Z-axis. With respect to FIGS. 6-7, as depicted, a height may be generally shown on top, a long edge generally shown on bottom, and a short edge generally shown therebetween.

FIG. 8 depicts the density variation between two selected parameter settings. That is, FIG. 8 depicts the density changes between parameter setting "A", of FIG. 6, and parameter setting "B", of FIG. 7. FIG. 8 illustrates the dependence of density on layer height/bead width for two different parameter settings. Density variation data between parameter setting variables may be desirable to a user. For example, a low infill may be represented in first parameter setting and high infill may be represented in a second parameter setting and comparing the difference in these two parameter settings may be useful to a user to avoid deviation (e.g., shrinkage) during part fabrication.

Figure 9A:
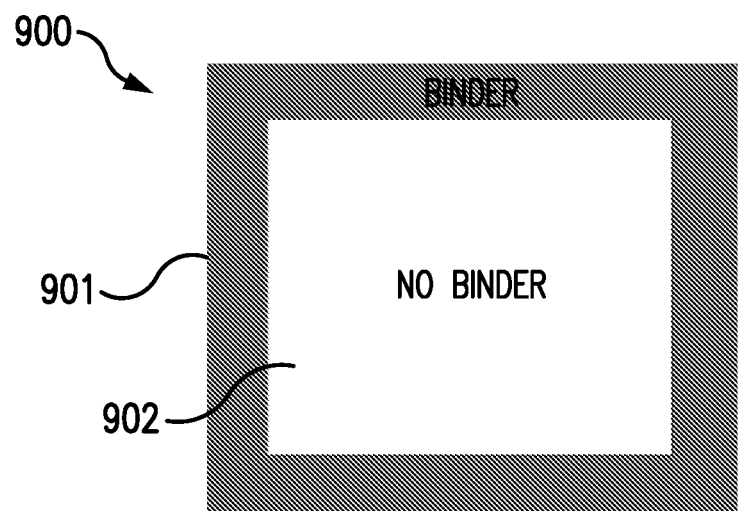
FIG. 9A depicts an exemplary object fabricated using two different methods (e.g., one with binder on an outer shell of the object, and one without binder on the inside) using an exemplary 3D fabrication system (i.e., a powder-bed binder jetting fabrication system), according to an embodiment of the present disclosure.
Figure 9B:
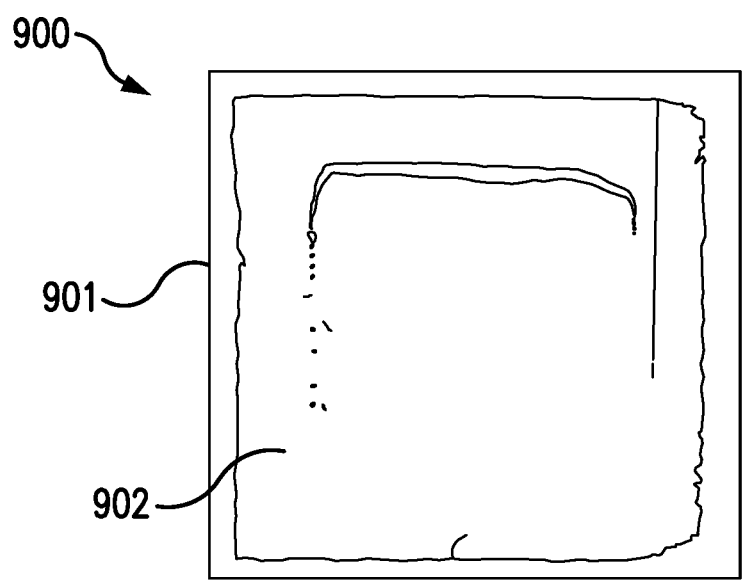
FIG. 9B is an exemplary illustration of the processed object of FIG. 9A depicting an exemplary shrinkage of each of the two methods, according to an embodiment of the present disclosure.

With respect to 3D fabrication systems that employ binder jetting, experimental data was generated on a cube, with reference now to FIGS. 9A-9B. In one case, a cube 900 was printed with a lower saturation (in this case, 0%) on the inside 902 versus the outer shell 901. Upon sintering the cube 900, the inside 902 shrank more than the outside 901. This may result in a strong effect of binder saturation on powder bed density.

In one aspect, the techniques described herein may be applied uniformly across a model. In another aspect, e.g., where shrinkage rates are known to vary by geometry or location (e.g., distance from an exterior surface), the shrinkage rates may be applied locally throughout a model as appropriate. In another aspect, transformation (e.g., scaling, offset, scaling with offset, etc.) may be applied, for example, independently for each layer, or on some other basis to capture local shrinkage effects that may affect scaling of the object during post-print processing. In another aspect, processes taught herein may be applied iteratively. Thus, for example, print parameters may be determined, a model may be sliced to generate a tool path, and a transformation (e.g., scaling, offset, scaling with offset, etc.) may be determined and applied throughout the model. Where the tool path has a substantial effect on the transformation (e.g., scaling, offset, scaling with offset, etc.), the model may then be re-transformed according to the initial analysis, and the transformed model may be re-sliced to create a new toolpath for the transformed, original 3D model. This may be repeated as necessary or helpful to bring the final object within a predetermined tolerance of the three-dimensional shape described in the original digital 3D model.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments of the subject matter described in this disclosure can be implemented using one or more modules of computer program instructions encoded on a computer-readable medium for execution by, or to control the operation of, data processing apparatus.

The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this disclosure can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this disclosure, or any combination of one or more such back-end, middleware, or front-end components. The components of the system can be interconnected by any form or medium of digital data communication, e.g., a communication network. Examples of communication networks include a LAN and a wide area network ("WAN"), an inter-network (e.g., the Internet), and peer-to-peer networks (e.g., ad hoc peer-to-peer networks).

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. While operations are depicted in the drawings in a particular order, this should not be understood as requiring that such operations be performed in the particular order shown or in sequential order, or that all illustrated operations be performed, to achieve desirable results.

In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

We claim:

1. A method for maintaining dimensional accuracy of a fabricated three-dimensional (3D) part by adjusting a 3D model used in metal additive manufacturing, comprising:

receiving, using a processor, a selection for fabricating a desired 3D part;

receiving a 3D model of the desired 3D part;

retrieving at least one model constant based on the selection;

receiving an input of at least one process variable parameter from a set of process variable parameters, wherein the at least one process variable parameter includes an offset based on a level of binder saturation to accommodate for binder bleeding;

transforming the 3D model of the desired 3D part based on the process variable parameters; and generating processing instructions for fabricating the transformed 3D model of the desired 3D part; and additively manufacturing the desired 3D part via binder jetting additive manufacturing.

2. A method for maintaining dimensional accuracy of a fabricated three-dimensional (3D) part by adjusting a 3D model used in metal additive manufacturing, comprising:

receiving, using a processor, a selection for fabricating a desired 3D part;

receiving a 3D model of the desired 3D part;

receiving an input of at least one process variable parameter from a set of process variable parameters;

retrieving at least one model and at least one associated model constant based on the selection;

generating transformation factors based on the at least one process variable parameter and the at least one model constant;

transforming the 3D model of the desired 3D part based on the transformation factors wherein the transformation includes at least one of an offsetting operation, a rotation operation and a stretching operation; and generating processing instructions for fabricating the transformed 3D model of the desired 3D part; and additively manufacturing the desired 3D part via binder jetting additive manufacturing.

3. A system for adjusting a three-dimensional (3D) model used in metal additive manufacturing, comprising:

a processor configured to:

receive, using a processor, a selection for fabricating a desired 3D part;

receive a 3D model of the desired 3D part;

retrieve at least one model constant based on the selection;

receive an input of at least one process variable parameter from a set of process variable parameters, wherein the at least one process variable parameter includes an offset based on a level of binder saturation to accommodate for binder bleeding;

generate transformation factors based on the at least one process variable parameter and the at least one model constant;

transform the 3D model of the desired 3D part based on the transformation factors; and generate processing instructions for fabricating the transformed 3D model of the desired 3D part, wherein the 3D part is to be manufactured via binder jetting additive manufacturing.

4. A non-transitory computer-readable medium storing instructions, the instructions, when executed by a computer system, cause the computer system to perform a method, the method comprising:

receiving, using a processor, a selection for fabricating a desired 3D part;

receiving a 3D model of the desired 3D part;

retrieving at least one model constant based on the selection;

receiving an input of at least one process variable parameter from a set of process variable parameters, wherein the at least one process variable parameter includes an offset based on a level of binder saturation to accommodate for binder bleeding;

generating transformation factors based on the at least one process variable parameter and the at least one model constant;

transforming the 3D model of the desired 3D part based on the transformation factors; and generating processing instructions for fabricating the transformed 3D model of the desired 3D part, wherein the 3D part is to be manufactured via binder jetting additive manufacturing.

* * * * *